United States Patent
Bates et al.

(10) Patent No.: US 8,015,583 B2
(45) Date of Patent: Sep. 6, 2011

(54) METHOD AND SYSTEM FOR PRICING A PROGRAMMING EVENT VIEWED BY SUBSCRIBER GROUP

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2355 days.

(21) Appl. No.: 09/749,106

(22) Filed: Dec. 27, 2000

(65) Prior Publication Data

US 2002/0083456 A1    Jun. 27, 2002

(51) Int. Cl.
*H04N 7/173* (2011.01)
(52) U.S. Cl. .............. 725/86; 725/87; 725/97; 725/104; 725/105
(58) Field of Classification Search .................. 725/1–8, 725/86–87, 101, 104, 89, 97, 100, 105, 131; 705/14, 26, 400, 14.1, 14.13, 26.1
See application file for complete search history.

(56) References Cited

U.S. PATENT DOCUMENTS

| | | | | |
|---|---|---|---|---|
| 3,790,700 A | * | 2/1974 | Callais et al. | 725/114 |
| 5,036,537 A | * | 7/1991 | Jeffers et al. | 380/241 |
| 5,914,712 A | * | 6/1999 | Sartain et al. | 725/9 |
| 5,935,206 A | * | 8/1999 | Dixon et al. | 709/219 |
| 6,016,141 A | * | 1/2000 | Knudson et al. | 345/721 |
| 6,067,564 A | * | 5/2000 | Urakoshi et al. | 725/2 |
| 6,269,343 B1 | * | 7/2001 | Pallakoff | 705/26 |
| 6,314,572 B1 | * | 11/2001 | LaRocca et al. | 725/60 |
| 6,754,904 B1 | * | 6/2004 | Cooper et al. | 725/32 |
| 6,769,127 B1 | * | 7/2004 | Bonomi et al. | 725/39 |

* cited by examiner

*Primary Examiner* — William Trost, IV
*Assistant Examiner* — John Schnurr
(74) *Attorney, Agent, or Firm* — Patterson & Sheridan, LLP (57) ABSTRACT

A method and apparatus for group billing purchasers of transmitted programming events is provided. In one embodiment, a subscriber group includes two or more individual subscribers who receive programming from a programming provider. The individual subscribers periodically elect to view a program provided via the program provider. The program is provided on a pay-per-view basis, meaning that the program provider requires a sum of money to be paid in order to view the program. The sum of money is determined according to the number of viewers in a single subscriber group. In one embodiment, the subscribers interact during a program via a network connection.

1 Claim, 8 Drawing Sheets

METHOD AND SYSTEM FOR PRICING A PROGRAMMING EVENT VIEWED BY SUBSCRIBER GROUP

BACKGROUND OF THE INVENTION

1. Field of the Invention

The present invention relates to the information processing field. More particularly, the invention relates to methods and apparatus for pricing programming events viewed by multiple viewers.

2. Background of the Related Art

The movie rental industry has seen substantial growth in recent years. Conventionally, movies have been rented in the form of videocassettes and DVDs. One advantage with such a rental system is that the physical storage medium, once rented, may be circulated between multiple viewers who can split the cost, even though the movie is viewed more than once and at different locations. However, such storage media is an imposition on users who must first receive the storage media (e.g., by physically visiting a video rental location) and later return the same.

More recently, movies and other programming events have been made available by cable and satellite providers. Movies can be purchased from such providers by accessing an online guide. Such guides are configured to allow customers to browse a wide selection of recently released movies and other video events. Once a customer identifies a movie he or she wishes to view, the customer then agrees to purchase the movie for some specified fee. The movie is then immediately, or at some later time, transmitted to the customer's display device and the appropriate fee is charged to the customer's account. In this manner, customers are able to avoid the inconveniences associated with renting physical video storage media.

One problem that the above described movie watching method does not overcome is that each transmission to a separate location (i.e. customer) is separately invoiced for the full amount of the movie. This is true even though the viewers may be related and may have agreed to view the program at the same time.

Therefore, there is a need for a method and apparatus that allows more flexibility in viewing movies and other programming events that are transmitted to viewers from a remotely located provider.

SUMMARY OF THE INVENTION

The present invention provides a method and system for group billing purchasers of transmitted programming events. One aspect of the invention provides a method for determining a price of a program transmitted by a programming provider to subscribers belonging to subscriber groups. The message comprises receiving, via a network connection, a purchase order for a program from a subscriber belonging to a subscriber group and then determining a price for the purchase order. A first price is determined for the purchase order if the program has been purchased by a threshold number of subscribers belonging to the subscriber group. A second price, higher than the first price, is determined if the program has not been purchased by the threshold number of subscribers belonging to the subscriber group.

Another aspect of the invention provides a system for transmitting programs to subscribers. The system comprises a database containing subscriber groups each including at least two subscribers and a programming provider system connected to the database. The programming provider system is configured to receive, via a network communication, purchase orders for programs from a plurality of subscribers and then determine a price for the purchase orders. A first price is determined for each purchase order if more than a threshold number of subscribers purchasing the same program belong to a common subscriber group. A second price, less than the first price, is determined for each purchase order if less than a threshold number of subscribers purchasing the same program belong to a common subscriber group.

Yet another aspect of the invention provides a system, comprising a plurality of signal processing units each associated with one of a plurality of subscribers and a programming provider system connected to the signal processing units. The plurality of subscribers make up a plurality of subscriber groups each including at least two subscribers. The programming provider system is configured to transmit fee-based programming events to the signal processing units; and determine prices of programming event purchased by the plurality of subscribers. A price for each programming event is determined according to a number of purchase orders for the same programming event received from subscribers belonging to a same subscriber group. In one embodiment, the plurality of subscribers communicate with one another. Illustratively, the plurality of subscribers may communicate through the programming provider system which receives and routes messages between the plurality of subscribers. Alliteratively, the plurality of subscribers may communicate directly with one another (that is, without requiring the intermediary programming provider system) via a network connection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

The present invention provides a method and system for group subscriptions to televised programming. In one embodiment, a subscriber group includes two or more individual subscribers who receive programming from a programming provider. The individual subscribers periodically elect to view a program provided via the program provider.

The program is provided on a pay-per-view basis, meaning that the program provider requires a sum of money to be paid in order to view the program. The sum of money is calculated according to the number of viewers in a single subscriber group that view a given program.

Figure 1:
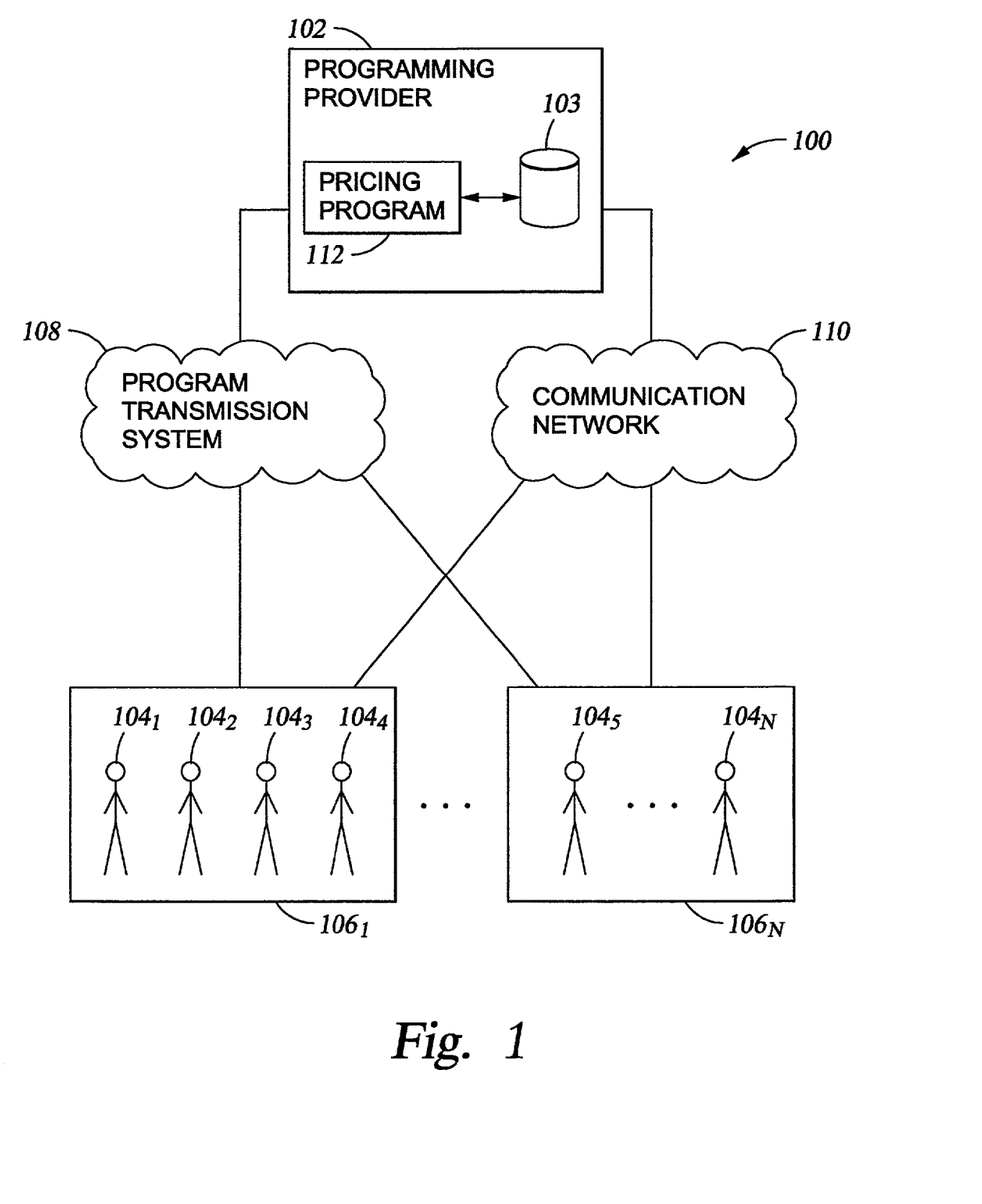
FIG. 1 depicts a simplified block diagram of a networked system connecting subscribers to a programming provider.

FIG. 1 is a high level diagram of a system 100 generally comprising a programming provider 102 and a plurality of subscribers $104_1, 104_2, \ldots 104_1$. Two or more of the subscribers make up a subscriber group $106_1 \ldots 106_n$. The provider 102 may be any entity (or entities) adapted to transmit visual and/or audio signals (programs) to the subscribers 104 via a program transmission system 108. The transmitted programs may include pay-per-view movies, view-on-demand movies and the like. Illustrative providers 102 include cable and satellite providers. In another embodiment, the provider 102 and the subscribers 104 are related as servers and clients in a distributed computer environment (e.g., the Internet).

As used herein, the term "subscriber" means any individual billable entity, which may include, for example, a person, a family and a corporation. Accordingly, each billable entity may be designated with a single account number (or invoicing number). In this context it is not necessary that the subscribers 104 be in contractual relationship with the provider 102 in which the provider 102 provides a suite or package of programs for a periodic (e.g., monthly) payment. Rather each program may be made available for "ala carte" selection by the subscribers 104. As will be clear from context, the term "subscriber" may also refer to the signal processing unit operated by the individual subscribers.

The provider 102 includes a database 103 containing information pertaining to each subscriber 104 and each subscriber group 106. Such information includes each individual subscriber's account number as well as a subscriber group number for each group. Other relevant information includes names, addresses credit card information, purchase orders for programming and the like. This information is used to generate an invoice for each subscriber or subscriber group, as will be described in more detail below. In one embodiment, the invoices are generated by a pricing program 112 executed by the provider 102.

The subscribers 104 are each connected to the programming provider 102 by a communication network 110. The network 110 may be any system for connecting the subscribers 104 and the provider 102 and allowing information exchange therebetween. In one embodiment, the network 110 also allows communication between the individual subscribers, particularly subscribers in a common subscriber group. Illustratively, the network 110 is the Internet. In another embodiment, the network 110 is a "plain old telephone system" (POTS). In any case, communication is facilitated by the appropriate transmission protocols and hardware support. Although shown separately, in one embodiment the communication network 110 and the program transmission system 108 are the same, such as where the two are the Internet.

Figure 2:
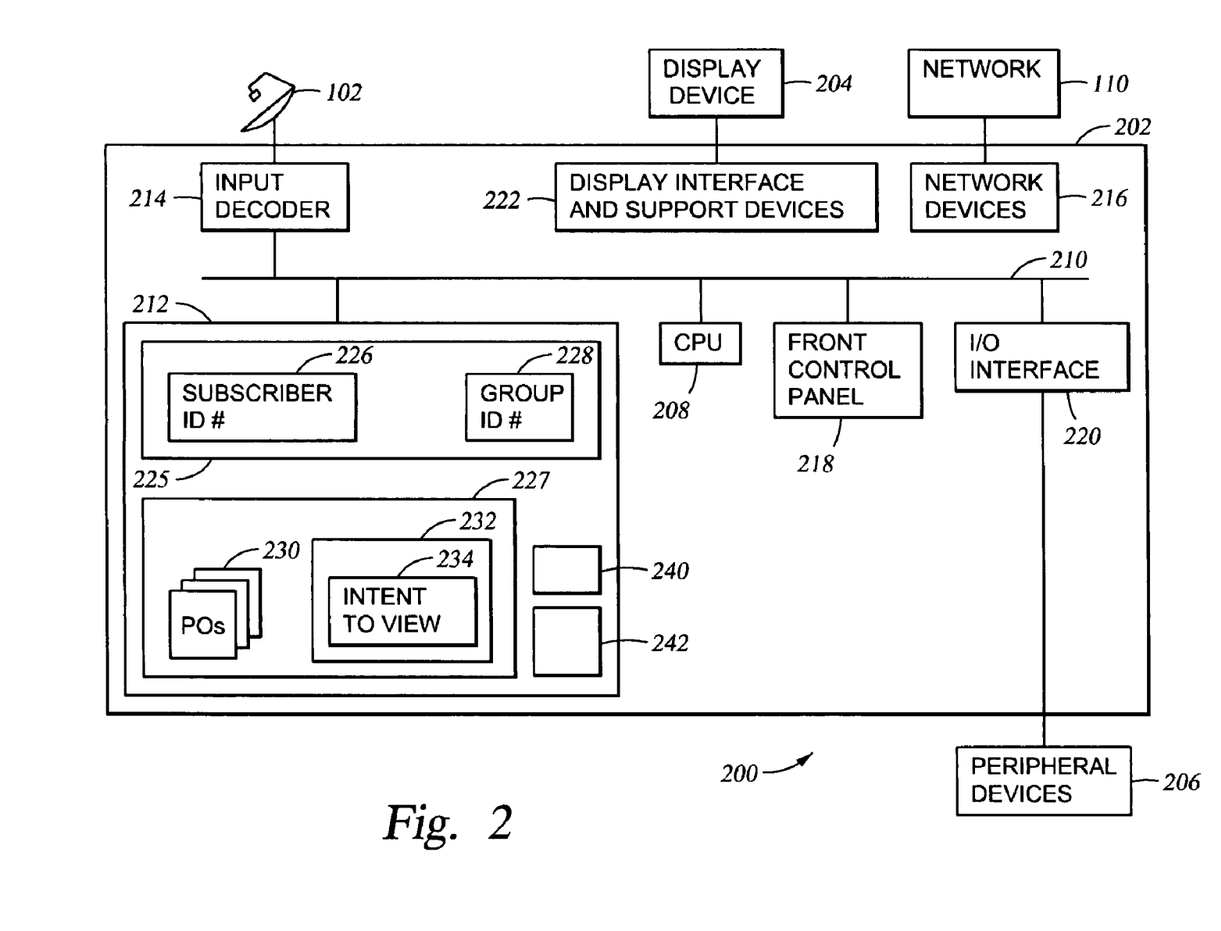
FIG. 2 depicts a diagram of an entertainment system operable to communicate with the provider.

Each of the subscribers possesses the necessary hardware and software to receive program transmissions from the provider 102 as well as communicate other information to the provider 102. FIG. 2 shows one embodiment of a subscriber's entertainment system 200. The entertainment system 200 includes a signal processing unit 202 connected to an display device 204 and one or more peripheral devices 206. The display device 204 is preferably any display screen (e.g., cathode ray tube, projection television and the like).

Illustrative peripheral devices 206 include, for example, a keyboard, keypad, light-pen, touch-screen, track-ball and speech recognition unit. In one embodiment, the display device 204 and some of the peripheral devices 206 could be combined. For example, a display screen with an integrated touch-screen, and a display with an integrated keyboard or a speech recognition unit combined with a text speech converter could be used.

In another embodiment, the signal processing unit 202, the display device 204 and the peripheral devices 206 are integrated with one another. Accordingly, in one embodiment, the entertainment system 200 is a portable device (e.g., handheld wireless device).

In general, the signal processing unit 202 includes a Central Processing Unit (CPU) 208 connected via a bus 210 to a memory device 212, a receiver/decoder 214, a network device 216, a control panel 218, an I/O interface 220 and a display interface 222. Although shown together, the various components of the signal processing unit 202 may in fact be separate components which, in some case, communicate with one another.

The receiver/decoder 214 is configured to receive and process incoming program signals from the provider 102 via the program transmission system 108. The signals processed by the receiver/decoder 214 are then transmitted to the display device 204 through the display interface 222, which may include amplifiers, digital to analog converters and other support devices.

The network device 216 includes the necessary hardware support for connecting the signal processing unit with the communication network 110. Illustratively, the network device includes any of a telephone modem, cable modem, ISDN line, DSL line and the like.

Although shown as a single entity, the I/O interface 220 represents an entry/exit device for any number of peripheral devices 206. Illustrative peripheral devices are described above. In one embodiment, the peripheral devices also include a remote control (e.g., an infrared remote control) configured to transmit user command signals to the signal processing unit 202. Alternatively or additionally, such command signals may be input via the control panel 218 (which may include various buttons, knobs, switches and the like).

Memory device 212 preferably comprises random access memory sufficiently large to hold the necessary programming and data structures. While memory device 212 is shown as a single entity, it should be understood that memory device 212 may in fact comprise a plurality of modules, and that memory 212 may exist at multiple levels, from high speed registers and caches to lower speed but larger DRAM chips. In addition, memory device 212 may also include read-only memory.

Memory 212 is shown containing an on-line guide program 240, a dialog program 242, a subscriber information data structure 225 and a programming data structure 227. The on-line guide program 240 supports various graphical interfaces provided to subscribers via the display. In addition to the interfaces described below, the on-line guide formats and displays the programming events being provided by the provider 102, as is known in the art. The dialog program 242 enables a discussion forum between subscribers during a programming event (e.g., a movie). An exemplary discussion forum is illustrated in the interface 300 shown in FIG. 3. The interface 300, which is output on the display device 204, includes a program viewing area 302 and a discussion area 304. As shown, the discussion area 304 is a portion of the total viewable screen area of the display device 204 in which viewers may post real-time messages. In one embodiment, the dimensions of the discussion area 304 are configurable by the subscriber operating the entertainment system 200. The messages are input to the peripheral devices 206 and communicated via the network 110. Illustratively, the messages are plain text messages, but in other embodiments the messages include images, video and other data formats.

The subscriber information data structure 225 contains a subscriber identification number 226 (account number) and a group identification number 228. The programming data structure 227 contains a plurality of purchase order data structures 230 and a future programming data structure 232. The purchase orders 230 represent recent program purchases made by the subscriber operating the entertainment system 200. As such, the purchase orders 230 pertain to programs that have already been transmitted from the provider 102 to the signal processing unit 202. In contrast, the future programming data structure 232 contains information about upcoming programs. For example, such information may include alarm settings used by the signal processing unit 202 to notify the subscriber of a particular show time. Other future programming information includes a timer setting used by the signal processing unit 202 to initiate a program recording session for a particular program and time.

In one embodiment, the programming data structure 227 contains "intent to view" information 234. Intent to view information represents that the subscriber has indicated an intent to view a particular program(s). This information can then be transmitted to other subscribers belonging to the same group. Accordingly, a notification system is provided by which subscribers of a common group can be made aware of one another's viewing intentions. Illustratively, the "intent to view" information is contained in the future programming data structure 232.

Figure 4:
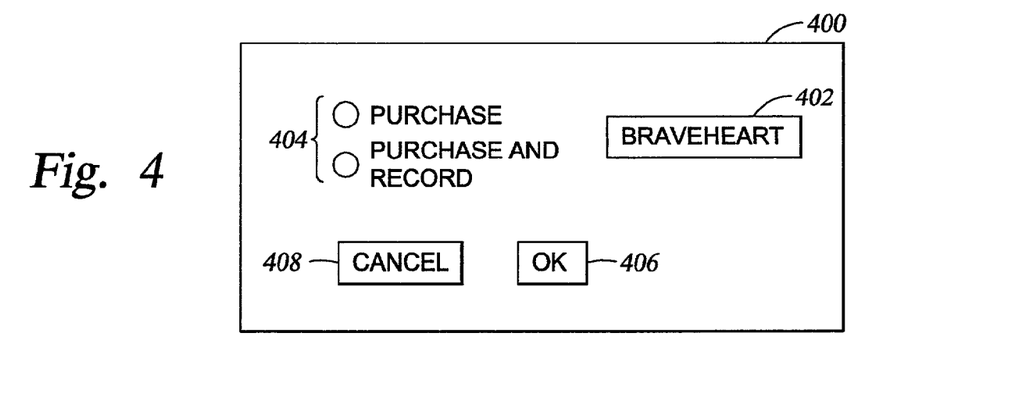
FIG. 4 depicts an interface configured for purchasing options.
Figure 5:
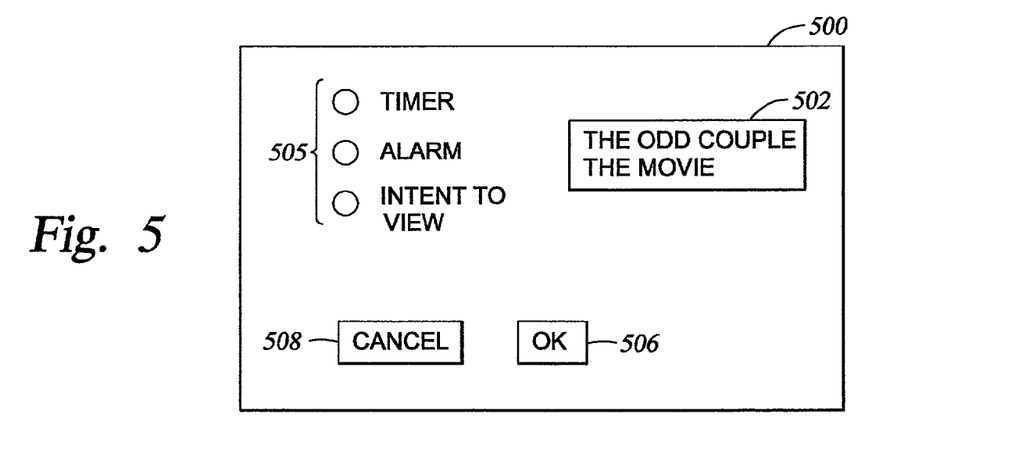
FIG. 5 depicts an interface configured for programming options.

Illustrative graphical interfaces used to populate the data structures 225 and 227 are shown in FIGS. 4 and 5. The interfaces may be invocations of an on-line guide provided by the programming provider 102 and output to the display 204. Such on-line guides are well known in the art and a detailed description is not needed for understanding. FIG. 4 shows a first interface 400 that may be displayed on the display 204 and is configured for purchasing a program. The interface 400 includes a program information window 402 and an action selection list 404. Illustratively, the program information window 402 may include a program title, a program runtime, a brief description of the program and the like. The action selection list 404 includes user selectable options such as an option to purchase a program or, alternatively, purchase and record the program. Buttons 406 and 408 are provided to accept the selected options or cancel the selections and close the interface 400, respectively.

FIG. 5 shows a second interface 500 that may be displayed on the display 204 and is configured with future programming elections. The interface 500 includes a program information window 502 and an action selection list 505. Illustratively, the program information window 502 may include a program title, a program runtime, a brief description of the program and the like. The action selection list 505 includes user selectable options such as timer and alarm options. In addition, the action selection list 505 includes an "intent to view" option. Buttons 506 and 508 are provided to accept the selected options or cancel the selections and close the interface 500, respectively.

In one embodiment, when a subscriber selects the "intent to view" option from the action selection list 505, this selection information is transmitted to the programming provider 102. This information may be transmitted to the programming provider 102 immediately or at some later time. However, in order to be useful to other subscribers of a common group the subscribers must receive the information prior to the show time of the selected program. Thus, in one embodiment, the transmission time may be determined according to the show time of the selected program. Where the selected program will air within a few hours the intent to view information should be transmitted immediately. Alternatively, where the selected program is not scheduled to air for many days, the information may be transmitted at some later time.

In another embodiment, the intent to view information may be transmitted directly from one subscriber to other subscribers belonging to a common subscriber group, without being routed to the provider 102 first. In such an embodiment, the signal processing unit 202 of each subscriber stores a network address for the signal processing unit of every other subscriber in the group.

Figure 6:
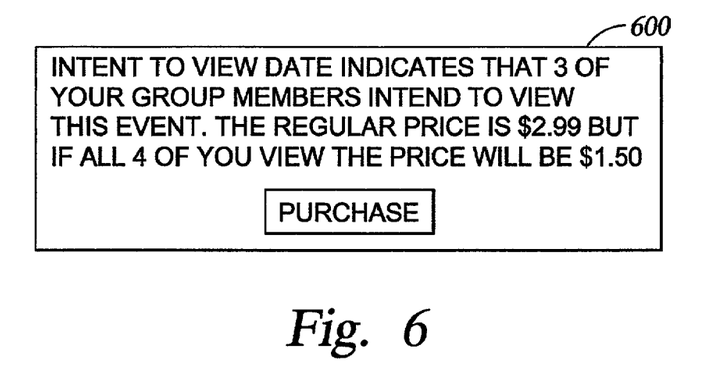
FIG. 6 depicts an interface configured to display pricing information.

In any case, the intent to view information is used to notify each subscriber of a group of other subscriber's intention to view a particular event. FIG. 6 shows an illustrative notification interface 600 that can be displayed on the display 204. The message provided by the interface 600 informs a subscriber that (in this example) three other group members intend to view the event of interest. In addition, pricing information is displayed. A regular price is provided and a group rate is provided which is calculated assuming that all four members of the group purchase the event.

In one embodiment, the notification interface 600 is invoked when a subscriber elects to purchase a particular event. Alternatively, the notification interface 600 may be invoked by user selection of a menu item on the on-line guide. In still another embodiment, the interface 600 is invoked when the subscriber elects to review a description of the program from the on-line guide. Further, the on-line guide may be modified so that "intent to view" programs (i.e., programs for which other group members have registered an intent to view) are visibly demarked with an indicator, such as an asterisk or highlighting.

Figure 7A:
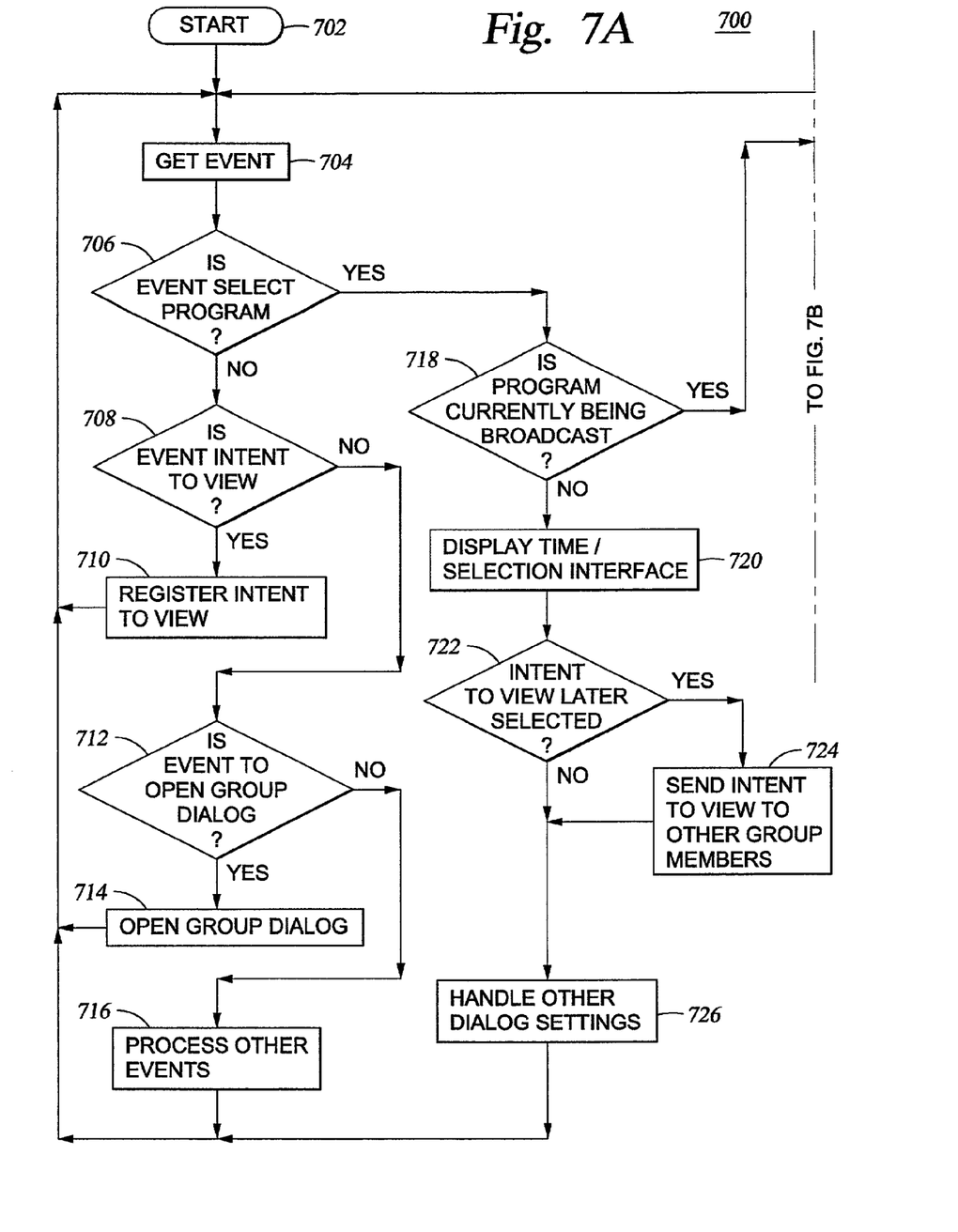
FIG. 7 shows a method for operating a signal processing unit.
Figure 7B:
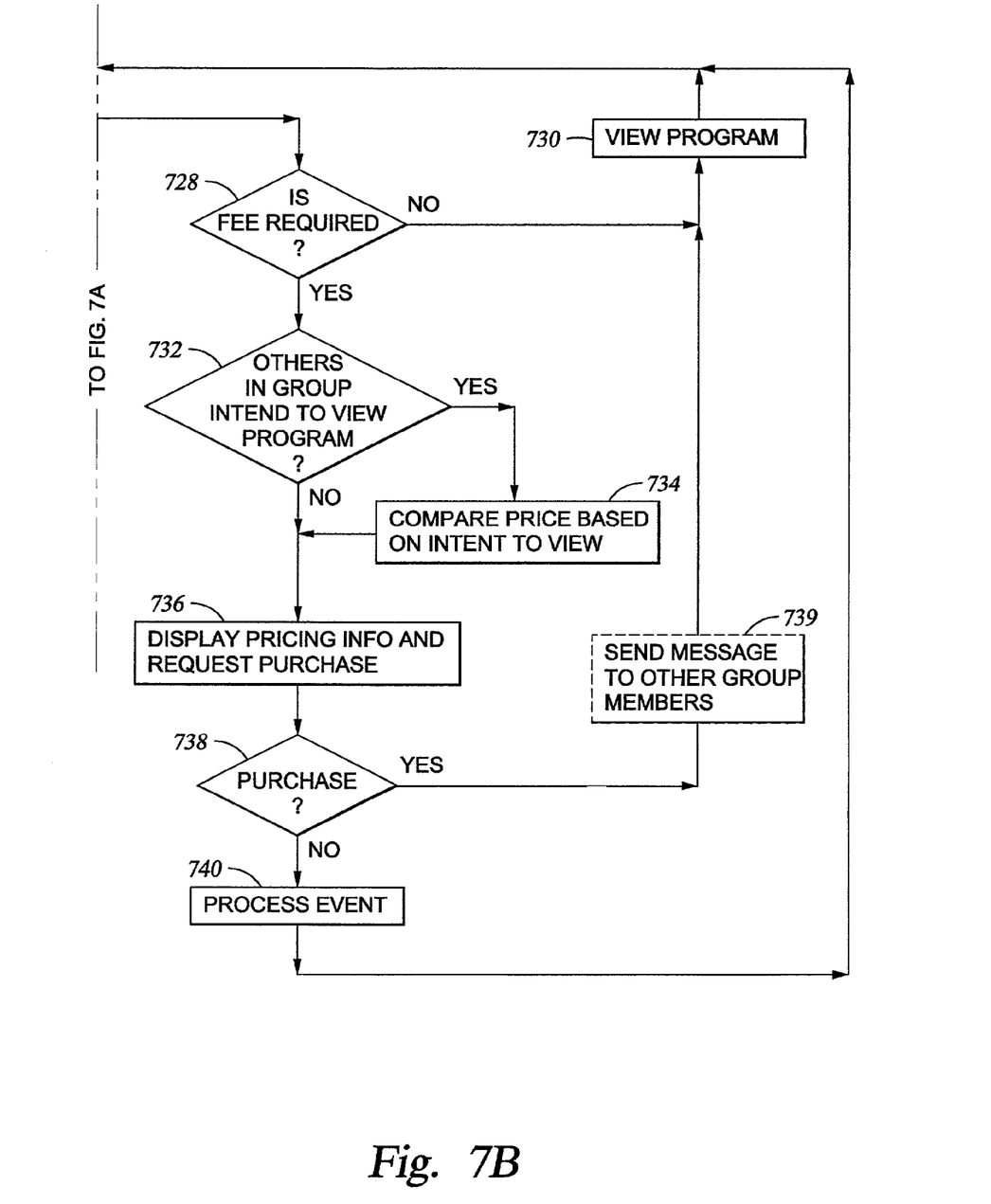

FIG. 7 shows a method 700 illustrating some operations of the entertainment center 200. The method 700 is entered at step 702 and then proceeds to step 704 where an event is received for processing. At step 706, the method 700 queries whether the event is to select a program. Such an event may be invoked when a subscriber selects a program event from the on-line guide using a remote control or the control panel 218 to operate the signal processing system 202.

If step 706 is answered negatively, method 700 proceeds to step 708 and queries whether the event is an "intent to view" message received by the signal processing unit 202 from an other subscriber in the group. If so, at step 710, the message is registered and stored in memory 212 from which it may later be retrieved to notify the subscriber operating the signal processing unit 202. Illustrative notification methods have been described above. From step 710 the method 700 returns to step 704 where the next event is received for processing.

Figure 3:
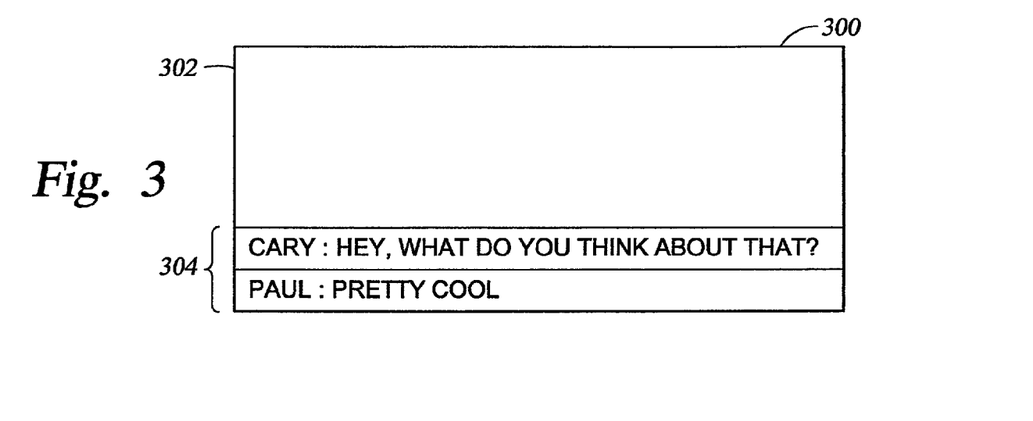
FIG. 3 depicts a dialog session interface.

If step 708 is answered negatively, then at step 712 the method 700 queries whether the event is to initiate a group dialogue, if so, a group dialogue session is initiated at step 714 in which two or more subscribers communicate in a manner that was described with reference to FIG. 3. If step 712 is answered negatively the method 700 continues to step 716 where other events are processed. The method 700 then returns to step 704 to begin processing the next event.

Returning to step 706, if the event is to select a program the method 700 proceeds to step 718 and queries whether the selected program is currently being broadcast by the provider 102. If the program is not currently being broadcast, then, at step 720, an interface providing show times, an "intent to view" option, recording options, purchase options etc. is displayed to the subscriber on the display device 204. An illustrative interface is shown in FIG. 5.

At step 722, the method 700 queries whether the "intent to view" option is selected from the interface. If so, an "intent to view" message is sent to the other group members at step 724 notifying them that at least one other subscriber intends to view the specified program. The method 700 then proceeds to step 726 to handle other selected interface options. If step 722 is answered negatively, the method 700 proceeds directly to step 726. From step 726, the method 700 returns to step 704.

If step 718 is answered affirmatively, the method 700, at step 728, queries whether a fee is required to view the selected program. If not, the selected program may be viewed in a normal manner at step 730. The method 700 then returns to step 704 to begin processing the next event.

If a fee is required, the method 700 proceeds to step 732 and queries whether other subscribers belonging to the same group have registered an intent to view the same program. This determination may involve accessing the memory to 212 in order to retrieve "intent to view" message received by the signal processing unit 202 from other subscribers. Additionally or alternatively, the signal processing unit 202 may establish a network connection with the programming provider 102 to retrieve "intent to view" messages posted at the provider 102 by other subscribers.

In any case, the method 700 then proceeds to step 734 in order to calculate a price for the selected program. As described above, the price is determined according to the number of subscribers who have registered an intent to view or are currently viewing the selected program. In one embodiment, the price per purchaser is reduced when more than a threshold number of subscribers in a common group purchase the program. At step 736 an interface containing pricing information and purchase options is displayed to the subscriber. An illustrative interface is shown in FIG. 6.

In some cases, the price that is displayed at step 734 is not the price that is invoiced by the programming provider 102. This may occur, for example, when additional subscribers purchase the programming event subsequent to step 734, in which case the final invoiced price may be lower then the displayed price. Alternatively, subscribers who registered an intent to view may ultimately decide not to purchase the program, in which case the final invoiced price may be higher than the displayed price. In this regard, some embodiments may not allow a subscriber to withdraw an "intent to view" registration, thereby providing subscribers greater confidence when the pricing information is displayed at step 734. Further, in one embodiment, the signal processing unit 202 may be configured to allow subscribers to access on-line billing statements which would accurately reflect current charges.

From step 736 the method 700 proceeds to step 738 and queries whether the subscriber has elected to purchase the program. If so, at optional step 739 a message is then transmitted to the other group members, either directly or through the provider 102, notifying them of the purchase. The method 700 then proceeds to step 730 where selected program is viewed. Otherwise, if step 738 is answered negatively, the method 700 proceeds to step 740 where the event being processed is handled appropriately. For example, the online guide interface being viewed by the subscriber (e.g., interface 600) is closed.

Figure 8:
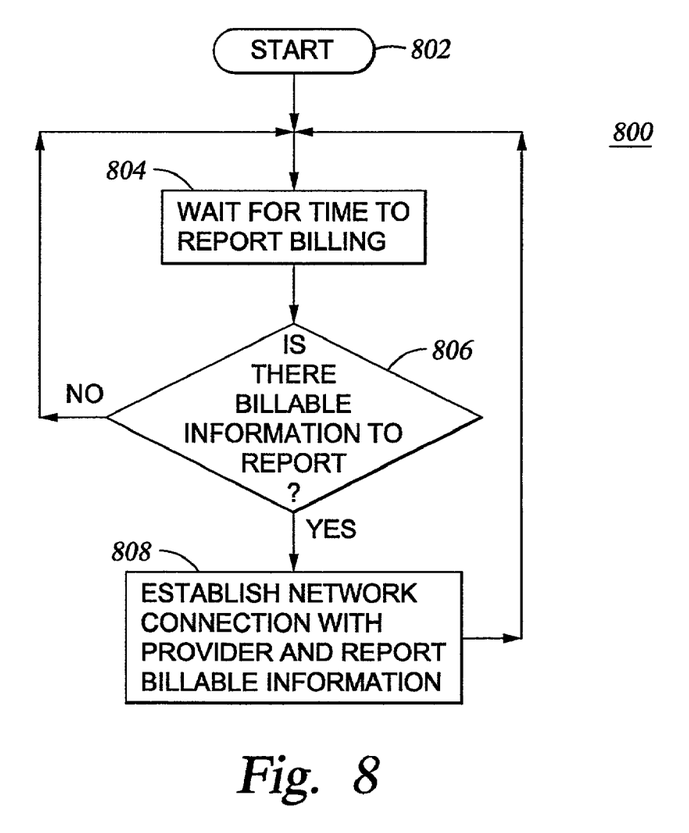
FIG. 8 shows a billing task.

Over the course of time a subscriber may purchase several programming events. Each of these purchases must be registered with the programming provider 102 in order for an invoice to be generated. However, in order to minimize the network connection time between subscribers and the provider 102, it may be desirable to transmit batches of purchases periodically. FIG. 8 shows an illustrative billing task 800 through which purchases made by a subscriber can be transmitted to the provider 102. The task 800 is entered at step 802 and proceeds to step 804 where the task 800 remains idle for a period of time (e.g., a week, a month or any convenient time interval). Once the period of time has elapsed, the task 800 proceeds to step 806 and queries whether billable information is available for reporting to the provider 102. If available information is available, a network connection is established with the provider 102, at step 808, which then receives the information from the subscriber. Otherwise, the task 800 returns to step 804.

Figure 9:
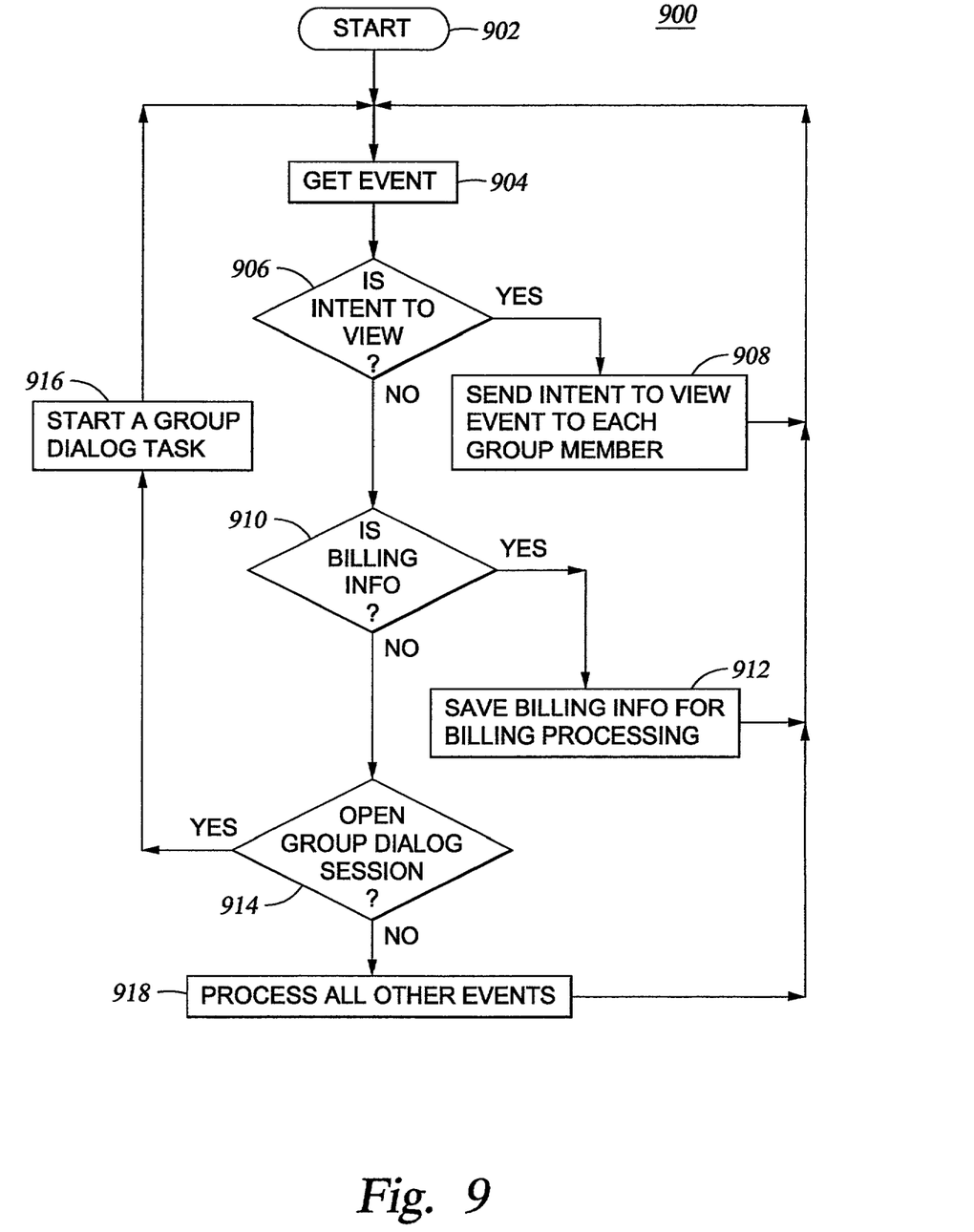
FIG. 9 shows a method for operating a programming provider system.

FIG. 9 shows a method 900 illustrating operations performed by the provider 102. The method 900 is entered at step 902 and proceeds to step 904 where an event for processing is received by the provider 102. Illustratively, the event is received upon establishing a network connection with a subscriber via the communication network 110.

At step 906, the method 900 queries whether the event is an "intent to view" message. If so, at step 908, the message is broadcast to each subscriber belonging to the group of the subscriber is sent the message. Otherwise, the method 900 proceeds to step 910 and queries whether the event is billing information. If so, the billing information is stored, at step 912, for subsequent billing processing. If step 910 is answered negatively, the method 900 proceeds to step 914 and queries whether the event is to open a group dialog session. If so, the method 900 proceeds to step 916 and initiates a group dialog task which may be run in parallel to method 900. The group dialog session may support a network dialog between two or more subscribers of a group. The particular subscriber participating may be determined by the subscriber initiating the session. If step 914 is answered negatively, then method 900 proceeds to step 918 to process other events.

Figure 10:
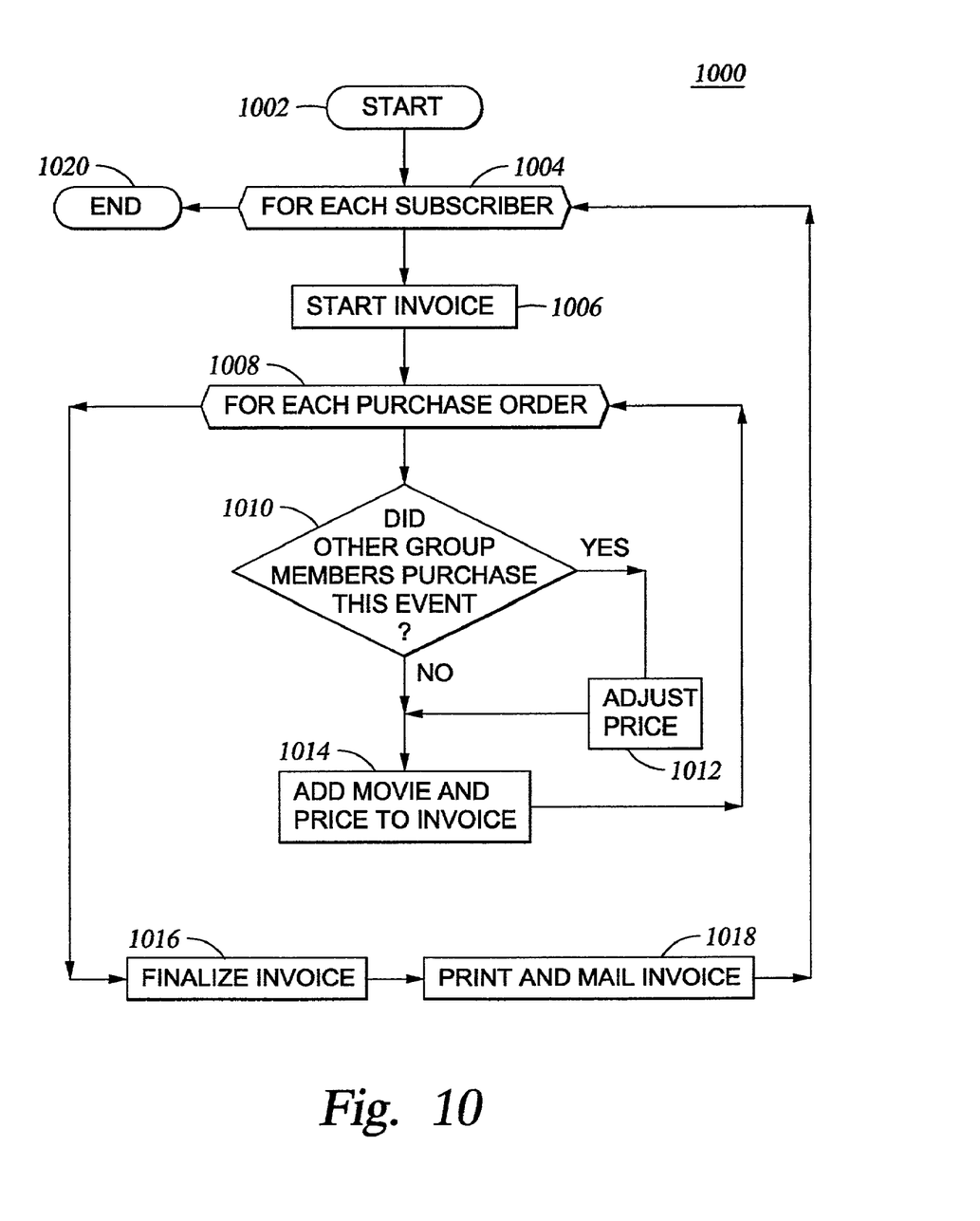
FIG. 10 shows a billing cycle method for generating invoices.

FIG. 10 shows an illustrative billing cycle method 1000. The method 1000 may be run periodically to generate an invoice for each subscriber. The method is entered at step 1002 and proceeds to step 1004 where invoice processing for a first subscriber is initiated. The method 1000 then proceeds to step 1006 where an invoice is initialized with subscriber information such as a name, address, telephone number, account number, group number, etc.

At step 1008 the method 1000 enters a loop that is repeated for each purchase order (i.e., for each programming event purchased). At step 1010 the method 1000 queries whether other group members purchased the same programming event. If so, the price is adjusted according to a predetermined formula at step 1012. Once the price is determined, or if step 1010 is answered negatively, the method 1000 proceeds to step 1014 where the price is added to the invoice. The method 1000 then returns to step 1008 to repeat the processing for the next purchase order. This loop is repeated until each purchase order has been processed, at which point the method 1000 proceeds to step 1016 to finalize (e.g., total) the bill. At step 1018 the invoice is transmitted to the subscriber (e.g., as an electronic document via the communication network 110).

From step 1018 the method 1000 returns to step 1004 where information for the next subscriber is accessed for processing. This loop is repeated until each subscriber is processed. The method then exits at step 1020.

While the foregoing is directed to the specific embodiments of the present invention, other and further embodiments of the invention may be devised without departing from the basic scope thereof, and the scope thereof is determined by the claims that follow.

What is claimed is:

1. A method for determining a price of a program transmitted by a programming provider to subscribers, comprising:

receiving, via a network connection, a purchase order for a program from a subscriber belonging to a subscriber group defined by two or more subscribers, wherein each subscriber belonging to the subscriber group maintains an independent account with the programming provider whereby the subscriber pays the programming provider in order to receive paid for programming, wherein each subscriber belonging to the subscriber group may elect to purchase or not purchase the program, and wherein the programming provider maintains a plurality of subscriber groups, wherein each group includes a subset of subscribers and wherein members of each subscriber group are determined prior to an offer to purchase the program;

offering, to a first subscriber group of the plurality of subscriber groups, the program to purchase at a predetermined price;

determining a first price for the purchase order if the program has been purchased by a threshold number of subscribers belonging to the first subscriber group; and determining a second price, higher than the first price, if the program has not been purchased by the threshold number of subscribers belonging to the first subscriber group, wherein the threshold number of subscribers belonging to the first subscriber group purchasing the program is all the subscribers of the first subscriber group.

* * * * *